(12) United States Patent
Lunde et al.

(10) Patent No.: US 6,477,111 B1
(45) Date of Patent: Nov. 5, 2002

(54) METHOD OF MAKING A MARINE SEISMIC STREAMER

(75) Inventors: Nils Lunde, Haslum (NO); Simon Hastings Bittleston, Bury St Edmunds (GB); Gunnar Parmann, Alvoen (NO); Jan-Age Langeland, Garnes (NO)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 09/806,797

(22) PCT Filed: Oct. 26, 1999

(86) PCT No.: PCT/GB99/03541

§ 371 (c)(1),
(2), (4) Date: Jul. 3, 2001

(87) PCT Pub. No.: WO00/26695

PCT Pub. Date: May 11, 2000

(30) Foreign Application Priority Data

| Oct. 29, 1998 | (GB) | 9823596 |
| Dec. 22, 1998 | (GB) | 9828263 |
| Jan. 12, 1999 | (GB) | 9900462 |
| Oct. 21, 1999 | (GB) | 9924988 |

(51) Int. Cl.⁷ .............................. G01V 1/38; G01V 1/20
(52) U.S. Cl. ........................ 367/20; 367/154; 174/101.5
(58) Field of Search .......................... 367/20, 153, 154; 174/101.5

(56) References Cited

U.S. PATENT DOCUMENTS

| 3,480,907 A | * | 11/1969 | King | 367/154 |
| 3,739,326 A | * | 6/1973 | Kerr et al. | 367/159 |
| 3,744,016 A | * | 7/1973 | Davis | 367/20 |
| 3,781,778 A | * | 12/1973 | Sawin et al. | 367/152 |
| 4,160,229 A | * | 7/1979 | McGough | 367/154 |
| 5,046,057 A | * | 9/1991 | Berni | 367/170 |
| 5,777,954 A | * | 7/1998 | Hepp | 367/20 |

FOREIGN PATENT DOCUMENTS

| DE | 1623488 | * | 2/1971 |
| GB | 2300917 A | * | 11/1996 |
| WO | WO-93/17356 | * | 9/1993 |
| WO | WO-95/35513 | * | 12/1995 |

\* cited by examiner

*Primary Examiner*—Ian J. Lobo
(74) *Attorney, Agent, or Firm*—David S. Figatner; Williams, Morgan & Amerson, P.C.

(57) ABSTRACT

A seismic streamer comprises a substantially solid core having many of the main components of the streamer, namely hydrophones, electronics modules for digitising the outputs of the hydrophones, the main optical and electrical conductor bundles and Keviar strength members, embedded in it. The core also contains a large number of foam buoyancy elements. An outer skin surrounds the core, defining an annular gap around the core, and this annular gap is filled with open-celled polyurethane foam saturated with kerosene. The capsules containing the hydrophones communicate with the annular gap around the core, so that the kerosene can enter the capsules, each of which contains an open-celled polyurethane foam sheath to cushion the hydrophone. In an alternative construction, made possible by using the buoyancy elements in the core to render the core approximately neutrally buoyant in water, the outer skin and the polyurethane foam are omitted, and the core is used on its own as a solid streamer.

34 Claims, 9 Drawing Sheets

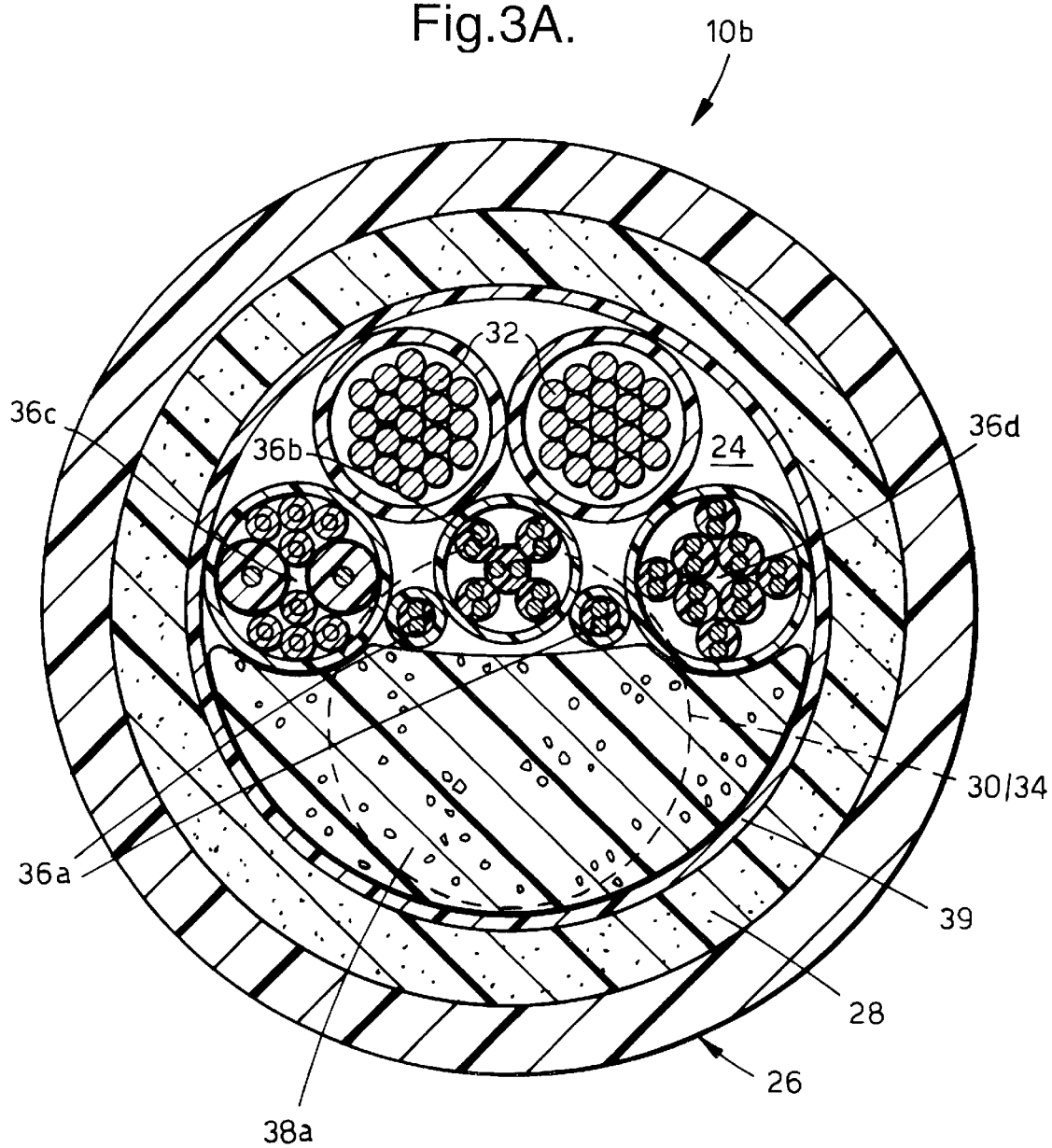

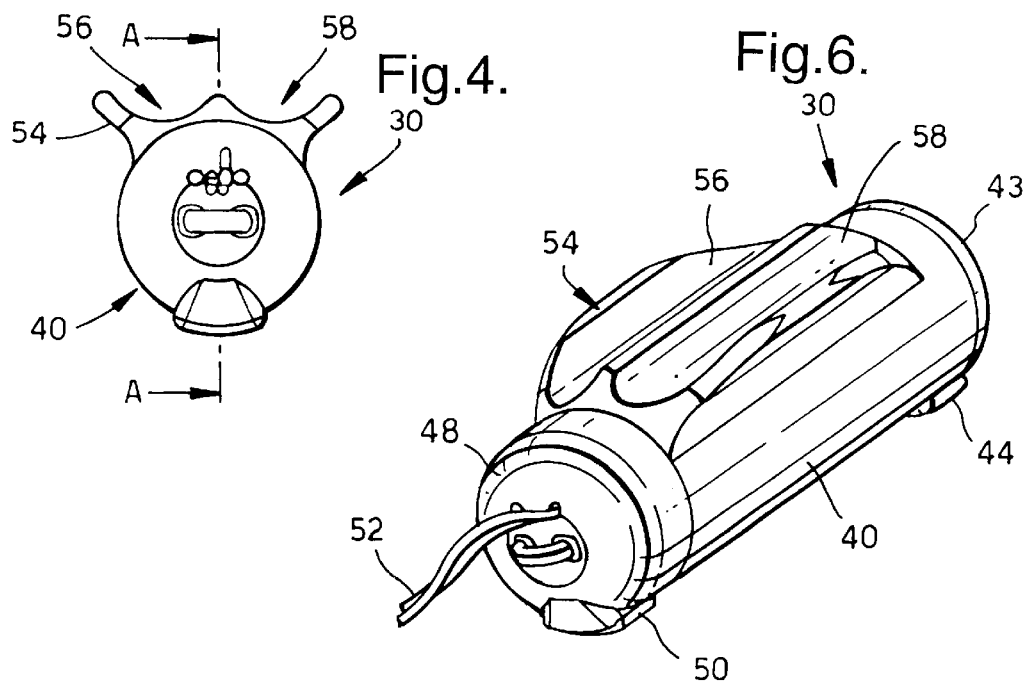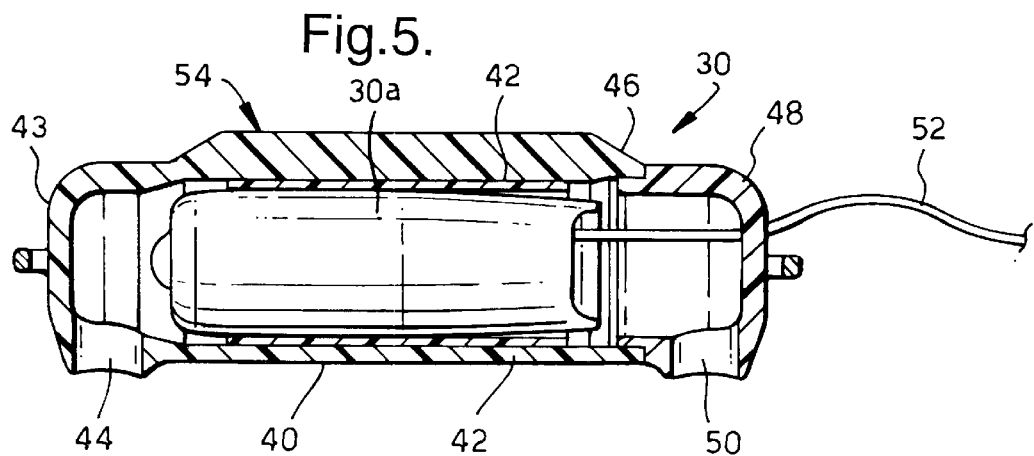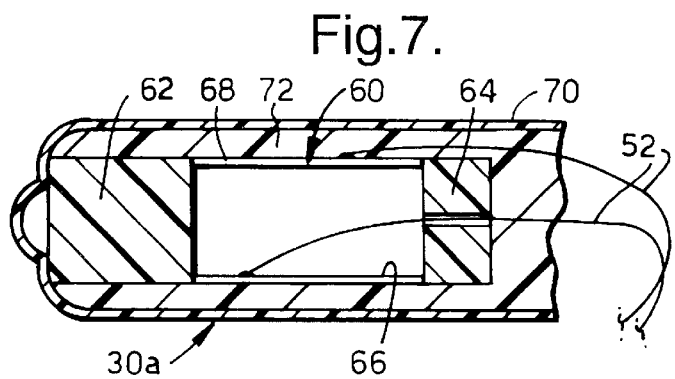

METHOD OF MAKING A MARINE SEISMIC STREAMER

BACKGROUND OF THE INVENTION

This invention relates to marine seismic streamers, and to methods of manufacturing such streamers.

This invention relates to marine seismic streamers, and to methods of manufacturing such streamers.

In order to perform a 3D marine seismic survey, an array of marine seismic streamers, each typically several thousand metres long and containing a large number of hydrophones and associated electronic equipment distributed along its length, is towed at about 5 knots behind a seismic survey vessel, which also tows one or more seismic sources, typically air guns. Acoustic signals produced by the seismic sources are directed down through the water into the earth beneath, where they are reflected from the various strata. The reflected signals are received by the hydrophones in the streamers, digitised and then transmitted to the seismic survey vessel, where they are recorded and at least partially processed with the ultimate aim of building up a representation of the earth strata in the area being surveyed.

A typical marine seismic streamer is made up of a large number of similar 100 metre streamer sections connected end-to-end, each section comprising a substantially cylindrical outer skin containing a pair of longitudinally extending strength members, typically Keviar ropes, to bear the towing forces. The hydrophones are substantially uniformly distributed along the length of the streamer section, and are interspersed with cylindrical spacers and foam elements which are mounted on the strength members, the foam elements being saturated in use with kerosene or a similar fluid to render the streamer section substantially neutrally buoyant. A streamer section of this general type, and more particularly its method of manufacture, are described in our co-pending PCT Patent Application No. PCT/IB99/00624 (WO99/), filed Apr. 15, 1998.

The streamer also includes electronics modules (or "bubbles") containing circuitry for digitising the reflected signals detected by the hydrophones and transmitting the digitised signals to the seismic survey vessels, these modules typically being connected between adjacent streamer sections.

While marine seismic streamers made up of streamer sections of this general type provide good overall performance, there is a continuous need for improvements in areas such as acoustic performance, diameter (reduced diameter gives reduced drag and easier handling), and robustness.

SUMMARY OF THE INVENTION

It is an object of the present invention in one of its aspects to provide a marine seismic streamer exhibiting improvements over the known type of streamer in at least some of these areas. It is a further object of the invention in another of its aspects to provide a method of manufacturing such an improved streamer.

According to one aspect of the present invention, there is provided a seismic streamer comprising an elongate substantially solid core, at least one longitudinally extending strength member and a plurality of hydrophones embedded in said core, a plastics outer skin surrounding said core and defining therearound an annular space, and plastics foam material adapted to be substantially saturated with liquid and substantially filling said annular space.

In a preferred embodiment of the invention, said hydrophones are encapsulated in capsules having at least one opening communicating with said annular space.

The streamer may include a plurality of foam buoyancy elements, typically made from a skinned plastics foam material such as skinned polypropylene foam, embedded in said core between said encapsulated hydrophones, and may further include a plurality of electronics modules each containing electronic circuitry for processing the signals produced by a plurality of said hydrophones, said electronics modules being embedded in said core between said hydrophones, along with electrical conductors for connecting the hydrophones to the electronics modules, electrical conductors for providing power to the electronics modules, electrical conductors for connecting the electronics modules to respective electro-optical conversion and multiplexing units connected in the streamer at intervals therealong, and optical fibres for interconnecting the electro-optical conversion and multiplexing units.

According to another aspect of the invention, there is provided a method of making a marine seismic streamer comprising an elongate substantially solid core, and at least one longitudinally extending strength member and a plurality of hydrophones embedded in said core, the method comprising the steps of:

forming a subassembly comprising said at least one strength member having said hydrophones secured thereto at intervals therealong;

drawing said subassembly through a plastic tube; and injecting plastics material or gel into said tube to substantially fill the rest of the interior of the tube.

In a preferred implementation of this aspect of the invention, the subassembly preferably comprises two parallel strength members, and the method further includes securing a plurality of foam buoyancy elements in said subassembly between the hydrophones, securing a plurality of electronics modules each containing electronic circuitry for processing the signals produced by a plurality of the hydrophones in said subassembly between the hydrophones, and securing electrical conductors connecting the hydrophones to the electronics modules, electrical conductors for providing power to the electronics modules, and optical fibres in said subassembly.

According to yet another aspect of the invention, there is provided a seismic streamer comprising an elongate plastics tube, at least one elongate strength member disposed within the tube and extending longitudinally thereof, a plurality of buoyancy elements which engage the strength member at intervals therealong, and a plurality of hydrophones longitudinally spaced apart within the tube and disposed between the buoyancy elements, the tube containing a substantially solid plastics or gel filler material around the hydrophones and the buoyancy elements.

According to a still further aspect of the invention, there is provided a method of making a seismic streamer, the method comprising the steps of:

forming a subassembly comprising at least one elongate strength member having buoyancy elements secured thereto at intervals therealong and hydrophones disposed between some of the buoyancy elements;

drawing said subassembly through a plastic tube; and injecting plastics material or gel into said tube to substantially fill the rest of the interior of the tube.

BRIEF DESCRIPTION OF THE DRAWINGS

The invention will now be described, by way of example only, with reference to the accompanying drawings, of which:

The invention will now be described, by way of example only, with reference to the accompanying drawings, of which:

FIG. 3A is an enlarged and more detailed cross sectional view of an alternative embodiment of a marine seismic streamer in accordance with the present invention;

FIG. 4 is an end view of an encapsulated hydrophone assembly forming part of the streamer of FIG. 2;

FIG. 5 is a sectional view on the line A—A of the encapsulated hydrophone assembly of FIG. 4;

FIG. 6 is a perspective view of the encapsulated hydrophone assembly of FIGS. 4 and 5.

FIG. 7 is a sectional view of the hydrophone of the assembly of FIGS. 4 to 6;

DETAILED DESCRIPTION OF THE PREFERRED EMBODIMENT

Figure 1:
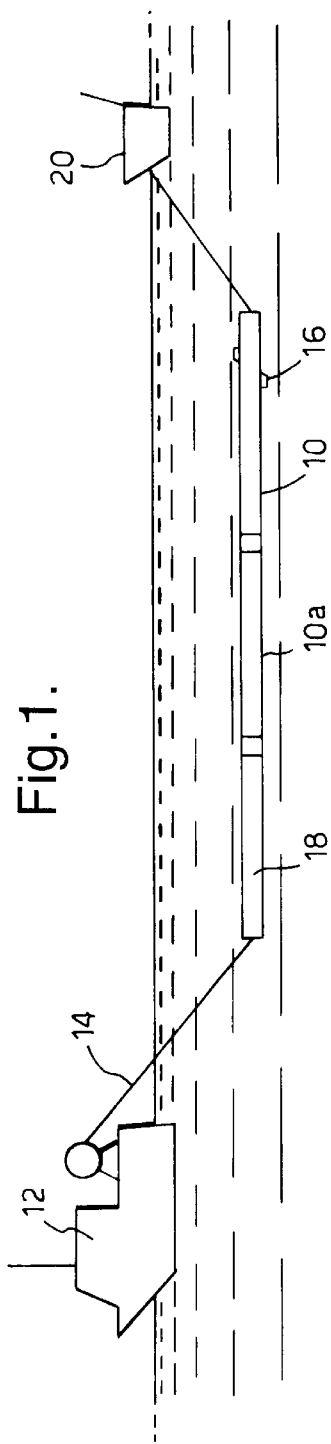
FIG. 1 is a somewhat diagrammatic representation of a seismic survey vessel towing a marine seismic streamer in accordance with the present invention in a body of water in order to perform a marine seismic survey.

FIG. 1 shows at 10 a streamer in accordance with the present invention being towed in the sea by a seismic survey vessel 12, in order to perform a marine seismic survey of the seabed beneath the streamer 10 and the vessel 12 in the manner described earlier. The streamer 10 is towed at a depth of about 6 to 10 metres below the surface of the water by means of its lead-in 14, ie. by means of the reinforced electro-optical cable via which power and control signals are supplied to the streamer and seismic data signals are transmitted from the streamer back to the vessel, the depth of the streamer being controlled, in known manner by depth controllers, or "birds", 16 distributed along the length of the streamer. Typically, the front end of the streamer 10 is mechanically coupled to the lead-in 14 by at least one vibration-isolating section (or "stretch section") 18, while the rear end is coupled to a tailbuoy 20 incorporating a GPS position measuring system, typically via another "stretch section" which has been omitted from FIG. 1 for the sake of simplicity.

The streamer 10 is made up from a plurality of similar 100 metre streamer sections 10a connected end-to-end. Part of one of these streamer sections 10a is shown in more detail in FIGS. 2 and 3, where it can be seen that the streamer section comprises a substantially solid cylindrical plastics core 24, coaxially surrounded by a plastics outer skin 26 which defines an annular gap 28 around the core. This annular gap 28 is substantially filled with tubular lengths of open-celled plastics foam material, which in use is substantially saturated with kerosene or a similar low density fluid. The plastics material of the core 24 and the outer skin 26 is typically polyurethane, as is the foam material in the annular gap 28, but other suitable plastics materials can be used if desired.

The major components of the streamer section 10a are embedded in the core 24, using a novel method which will be described in more detail hereinafter. These major components include uniformly longitudinally spaced encapsulated hydrophone assemblies 30, which will be described in more detail hereinafter, a pair of parallel, longitudinally extending, woven Kevlar rope strength members (or "stress members") 32, a plurality of electronics modules 34, typically one for every three of the hydrophone assemblies 30, disposed between the hydrophone assemblies, and wire and optical fibre bundles 36. The bundles 36 contain electrical conductors for connecting the encapsulated hydrophone assemblies 30 to the electronics modules 34, and for conveying the digital output signals produced by the electronics modules 34 along the streamer section 10a, as well as additional electrical conductors for conveying electrical power and control signals along the streamer section 10a and optical fibres whose function will become apparent hereinafter. Additionally, a plurality of buoyancy elements (or "pills") 38, made of skinned polypropylene foam, are moulded into the core 24 between the hydrophone assemblies 30 and the electronics modules 34. The number and density of the buoyancy pills 38 are selected such that their buoyancy effect, combined with that of the kerosene or other fluid in the foam material in the annular gap 28, renders the streamer section 10a substantially neutrally buoyant in water: typically, the density of the buoyancy pills 38 is about 0.6.

The adjacent ends of the stress members 32 at each end of the streamer sections 10a are joined together, as described in the aforementioned PCT patent application, such that the members 32 form a single continuous loop, the opposite ends of this loop being secured to respective mechanical terminations (not shown) forming parts of the end connectors of the streamer section.

The electronics modules 34 each comprise electronic circuitry for digitising the respective output signals produced by each of the hydrophone assemblies 30, and for transmitting the digitised signals along the streamer section 10a to cylindrical electronics units, or "bubbles", connected between some of the streamer sections. The circuitry of each electronics module 34 is disposed within a cylindrical metal container, preferably of aluminium, which serves to shield the circuitry from external electrical interference. The digitised hydrophone output signals are converted into optical signals in the electronics bubbles, for multiplexing and high speed onward transmission via the optical fibres in the bundles 36 to the vessel 12, where they are processed and recorded: thus it will be appreciated that the optical fibres serve to interconnect the electronics bubbles.

Figure 2:
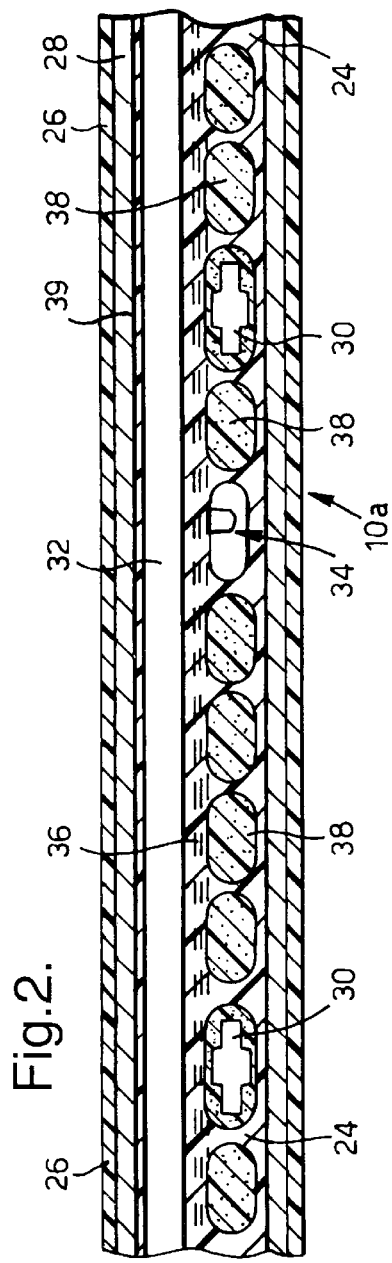
FIG. 2 is an enlarged longitudinal sectional view of part of the streamer of FIG. 1.
Figure 3:
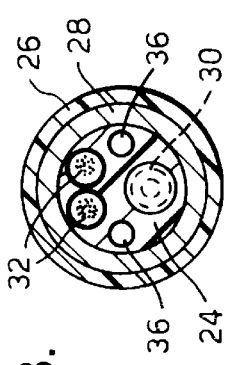
FIG. 3 is a cross sectional view of the streamer of FIG. 2.

The streamer section of FIG. 3A is indicated by reference 10b, and has many features in common with the streamer section 10a of FIGS. 2 and 3: these common features are given the same references as in FIG. 2.

Thus the streamer section 10b comprises a solid core 24 coaxially surrounded by a plastics outer skin 26 which defines an annular gap 28 around the core, the annular gap being filled with polyurethane foam saturated with kerosene or other low density fluid. The core 24 has two longitudinally extending Kevlar stress members 32 embedded in it, along with encapsulated hydrophone assemblies and electronics modules indicated schematically by a dotted circular line and referenced 30/34.

The wire and optical fibre bundles 36 of the streamer section 10a, which are shown only schematically in FIGS. 2 and 3, are replaced in the streamer section 10b by two multi-conductor bundles 36a connecting the encapsulated hydrophone assemblies 30 to the electronics modules 34, a multi-conductor line 36b connecting the outputs of the electronics modules to the aforementioned electronics "bubbles", a multi-conductor, multi-optical fibre main power and data bundle 36c, and a multi-conductor bundle 36d containing auxiliary power, control and data lines for connection to streamer position control devices ("birds") and acoustic streamer position sensing devices connected at intervals along the streamer 10.

The bundles 36a to 36d are distributed across a space extending diametrically across the streamer section 10a, with the Kevlar stress members 32 on one side of them. The generally cylindrical buoyancy pills 38 of the streamer section 10a are replaced by pills 38a of the same material but generally semi-circular in cross section, disposed on the other side of the bundles 36a to 36d and shaped to partly conform to them.

Also visible in FIG. 3A (but not in FIG. 3) is a polyurethane tube 39, which forms the outer skin of the solid core 24 and whose function will be described in more detail hereinafter.

One of the encapsulated hydrophone assemblies 30 is shown in more detail in FIGS. 4 to 6, and comprises a substantially cylindrical polyurethane plastics capsule 40 having a substantially cylindrical hydrophone 30a mounted coaxially inside it. An annular sheath 42, of the same plastics foam material as is disposed in the annular gap 28 around the core 24, surrounds the hydrophone 30a, and substantially fills the annular space between the outside of the hydrophone 30a and the inside of the capsule 40 so as to cushion the hydrophone within the capsule.

One end 43 of the capsule 40 is axially closed but provided with a radial inlet opening 44, while the other end 46 is closed, after insertion of the hydrophone 30a, by a cap 48 provided with a radial inlet opening 50 similar to the inlet opening 44. The inlet openings 44, 50 protrude from the capsule 40, and are put into communication with the annular gap 28 around the core as will be described hereinafter, so permitting the kerosene or other fluid in the gap 28 to enter the capsule and saturate the sheath 42.

The hydrophone 30a has electrical output leads 52 which pass through the respective holes in the cap 48 to connect up with the wire bundles 36 (or 36a).

Moulded into the external surface of the capsule 40 are locating means 54 defining two closely adjacent part-circular grooves or channels 56, 58, which receive and locate with respective ones of the stress members 32 during the manufacture of the core 24, as will hereinafter be described.

One of the hydrophones 30a is shown in section in FIG. 7, and comprises a hollow piezoelectric cylinder 60 made from a suitable ceramics material and closed at each end by respective PVC end caps 62, 64. Respective electrodes 66, 68 are deposited on the internal and external surfaces of the cylinder 60, and respective ones of the aforementioned output leads 52 are soldered to these electrodes. The cylinder 60 is coaxially disposed in a substantially cylindrical PVC-based boot 70, the space within the boot around the cylinder being filled with a suitable epoxy potting compound 72 which is compatible with the kerosene or other fluid in the annular gap 28 and the capsule 40, and which forms a seal around the output leads 52.

The way in which the streamer section 10b of FIG. 3A is made will now be described.

First, a subassembly (or harness) is made up, the subassembly comprising: the Kevlar stress members 32, which are held under tension; the encapsulated hydrophone assemblies 30, which are located on the stress members 32 by means of the grooves 56, 58 on the capsule 40 at uniformly spaced positions along the stress members, and then glued thereto; the electronics modules 34, which are located on and glued to the stress members 32 in a manner analogous to that used for the encapsulated hydrophone assemblies 30; the bundles 36a to 36d, which are preformed, glued to the stress members 32 at intervals, and electrically connected by soldering to the encapsulated hydrophone assemblies 30 and to the electronics modules 34 as appropriate; and the buoyancy pills 38a, which are located on and glued to the bundles 36a to 36d. The subassembly can be made up using a suitably modified version of the apparatus described in the aforementioned PCT patent application.

Second, the aforementioned polyurethane tube 39 is drawn over the subassembly (or the subassembly is drawn through the tube, which amounts to the same thing): in this description and in the claims, both these possibilities are intended to be encompassed by the expression "the subassembly is drawn through the tube". To assist in this process, a suitable lubricant can be applied to the inside of the tube 39 and/or to the outside of the subassembly.

Third, the tube 39 with the subassembly inside it is supported horizontally, and polyurethane plastics material is injected under pressure into the tube via one or both of its ends and via orifices provided for the purpose along the length of the tube, to entirely fill the inside of the tube around the subassembly (and any open spaces between the individual components making up the subassembly). To assist the injected plastics material to remain sufficiently fluid to flow the full length of the tube, the tube can be surrounded by a jacket through which a heated fluid is arranged to circulate continuously throughout the injection process.

Fourth, the injected plastics material is allowed to cure.

Fifth, the tube 39, which is substantially transparent, is perforated by drilling through it in alignment with the openings 44 and 50, in order that these openings should be open to the outside of the tube 39.

At this point, the core 12 is substantially complete, and the streamer section 10b is completed by connecting the stress members 32 and the electrical and optical bundles 36a to 36d at each end of the core to the streamer section end connectors, sliding the tubular lengths of open-celled foam material over the core, sliding the outer skin 26 over the foam material, and filling the annular gap 28 occupied by the foam material with kerosene or a similar fluid.

Figure 8:
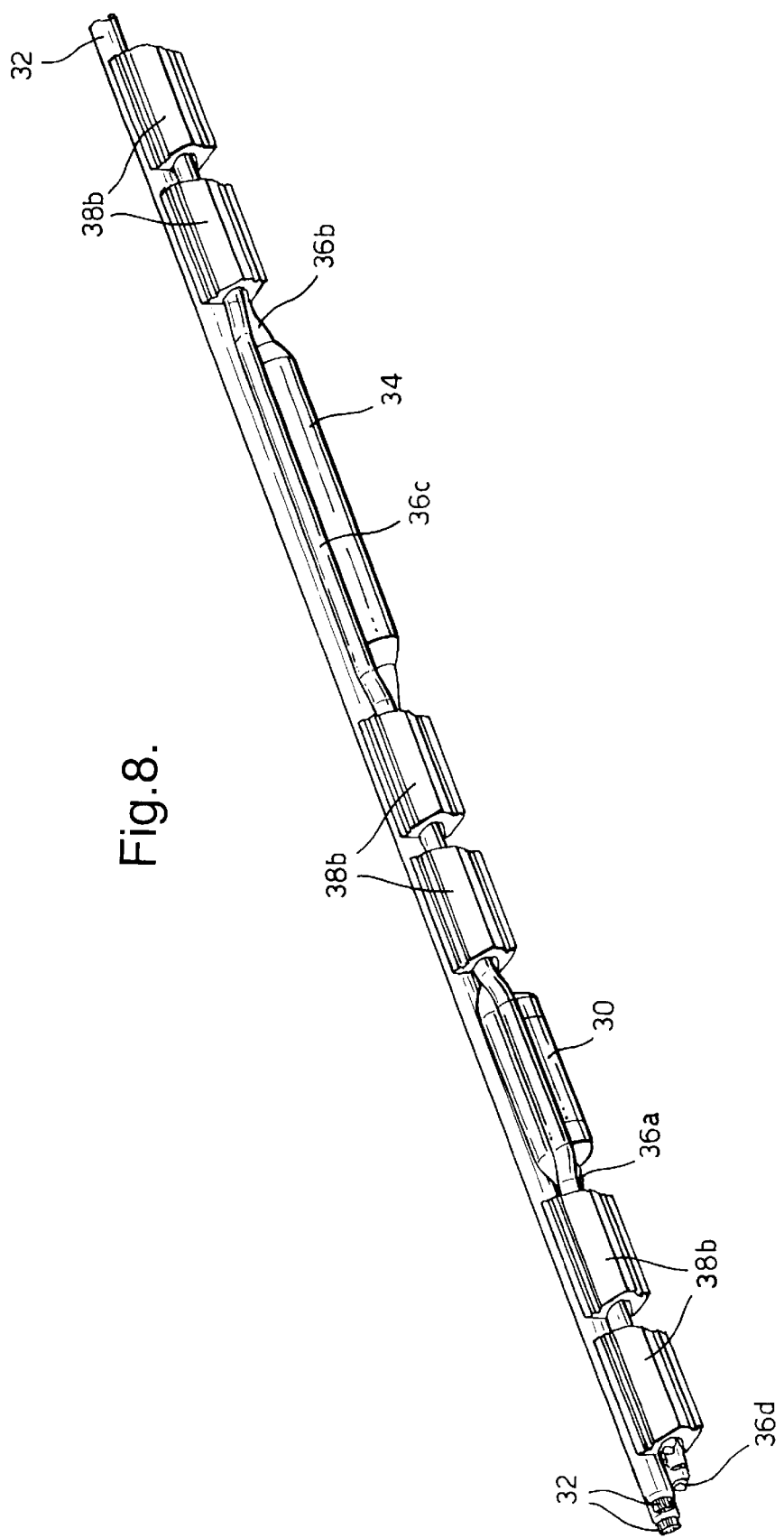
FIG. 8 is a perspective view of a subassembly made up during the manufacture of an alternative embodiment of a marine seismic streamer in accordance with the present invention.
Figure 9:
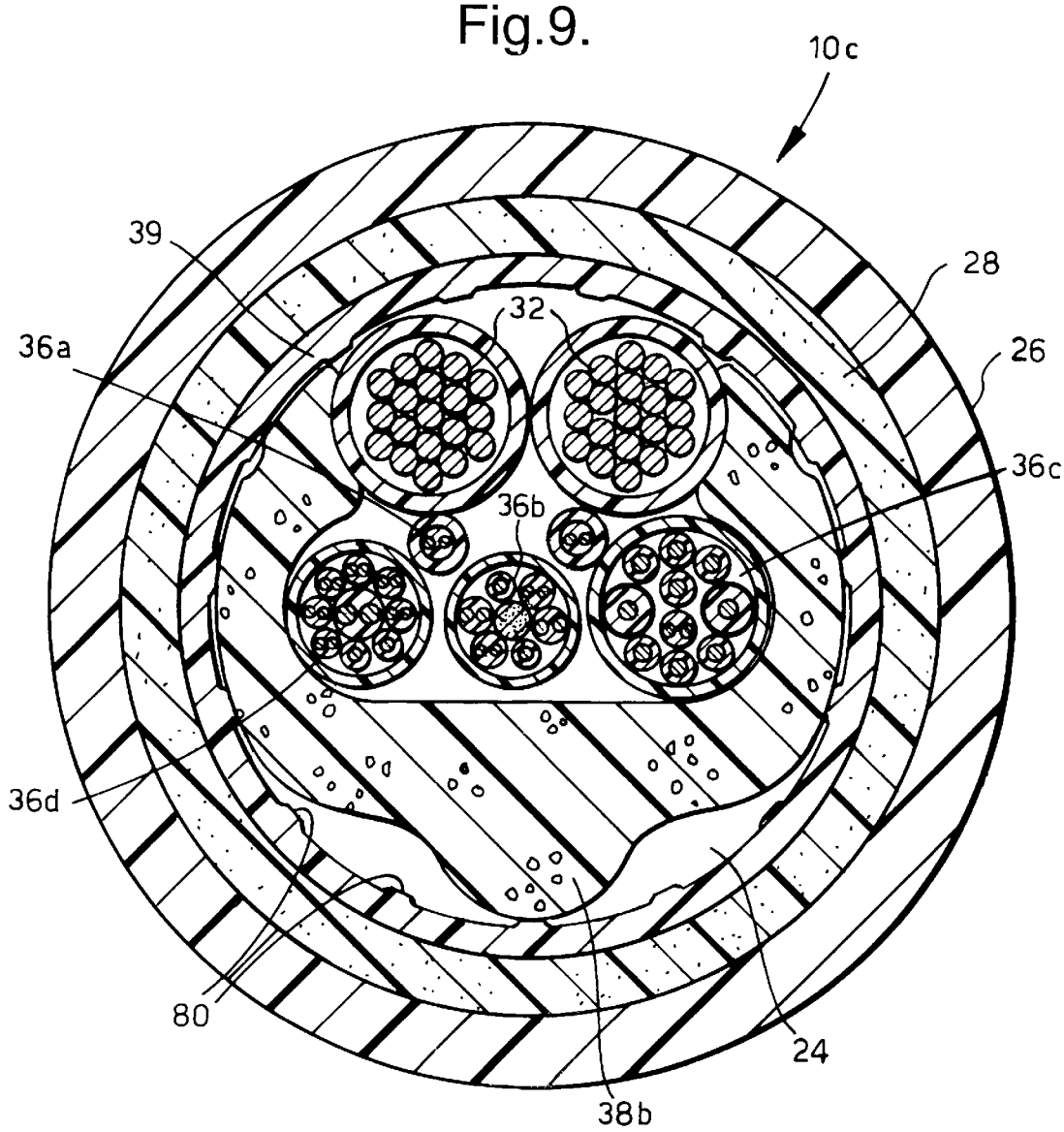
FIGS. 9 and 10 are sectional views at different points along the streamer based on the subassembly of FIG. 8.
Figure 10:
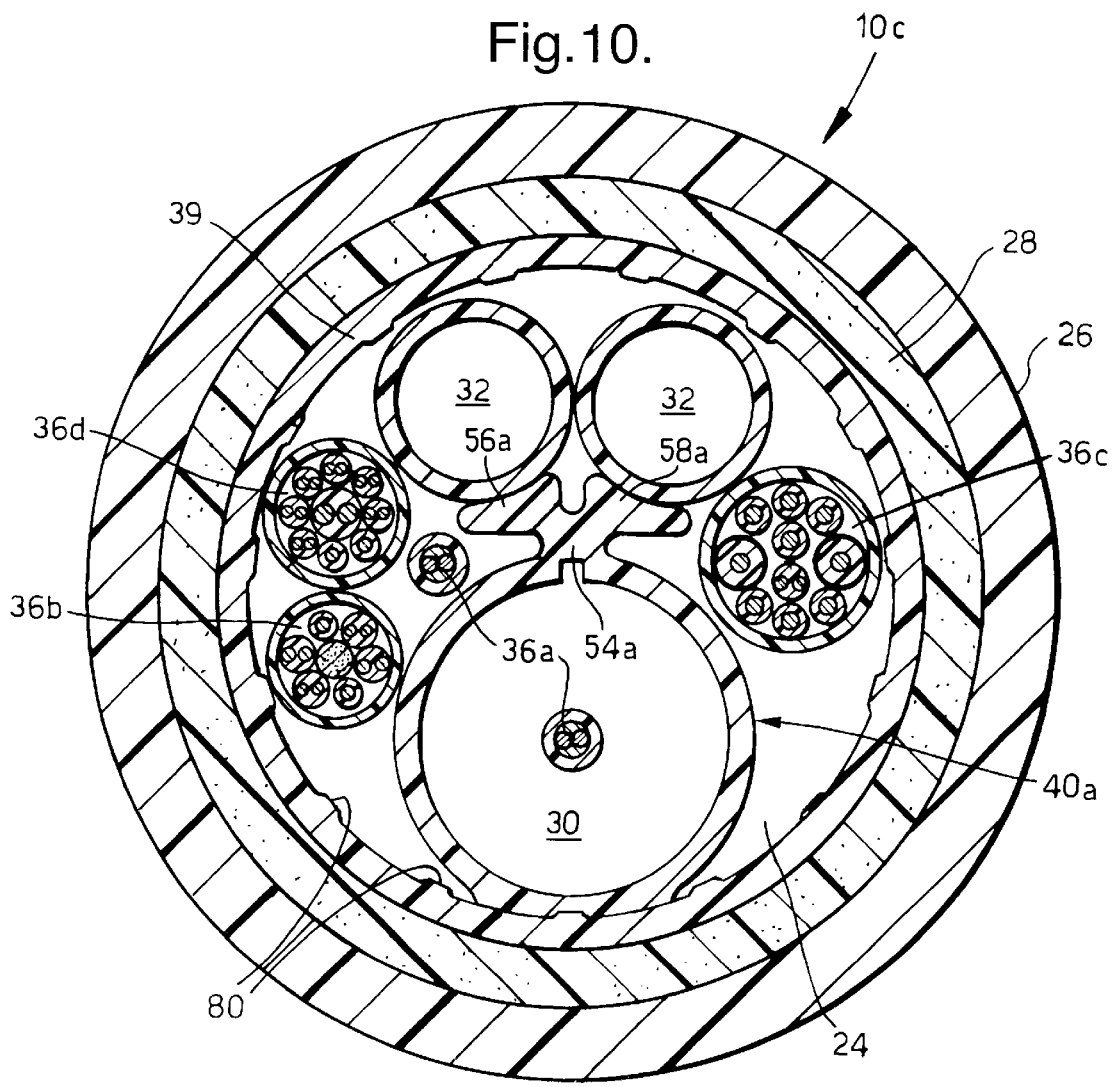

FIGS. 8 to 10 taken together show at 10c a slightly modified version of the streamer section 10b of FIG. 3A. The streamer section 10c again has many features in common with the streamer section 10a of FIGS. 2 and 3: these common features are therefore again given the same references as in FIGS. 2 and 3.

FIG. 8 shows the subassembly (or harness) made up during the manufacture of the streamer section 10c by the method described in relation to the streamer section 10b.

This subassembly comprises the two Kevlar stress numbers 32, the encapsulated hydrophone assemblies 30, the electronics modules 34 and the bundles 36a to 36d, all arranged substantially as already described. The main differences lie in the cross-sectional shape of the buoyancy pills, indicated at 38b, and of the capsules, indicated at 40a, of the hydrophone assemblies 30.

Thus the buoyancy pills 38b are approximately U-shaped in cross-section, and adapted to surround and lightly grip the bundles 36a to 36d between the limbs of the U-shape, with the extremities of the limbs of the U-shape engaging and lightly gripping the Kevlar stress members 32, as best seen in FIG. 9.

The capsule 40a differs from the capsule 40 in relation to the shape of the locating means which locate against the Kevlar stress members 32. Thus the locating means 54 containing the grooves 56, 58 in the capsule 40 is replaced in the capsule 40a with more flexible locating means, indicated at 54a in FIG. 10, containing vestigial grooves 56a, 58a which are formed so that part of the base of each groove has a degree of flexibility.

The subassembly of FIG. 8 is again made up using glue to secure the various components to the stress members 32 where appropriate.

One other small difference between the streamer section 10b and the streamer section 10c lies in the cross-sectional shape of the polyurethane tube 39. Thus in the streamer section 10c, the tube 39 is provided with circumferentially spaced small ribs 80 which extend longitudinally along its internal surface, as can be seen in FIGS. 9 and 10. These ribs 80 effectively serve to create a slight annular gap between the subassembly within the ribs 39 and the greater part of the internal surface of the tube, to ease the injection of the polyurethane plastics material into the tube around the subassembly during manufacture of the streamer section 10c.

The embodiments of the streamer of the present invention described with reference to FIGS. 1 to 10 have a number of advantages. They have a relatively small diameter, about 48 mm, which reduces drag and facilitates deployment, recovery and storage. Additionally, acoustic performance is improved, since the hydrophones, by virtue of being encapsulated and embedded in the solid core 24, are well insulated against noise, in particular noise due to weather and mechanically induced noise due to cross flow, while at the same time being sensitive to the reflected seismic signals via the fluid communication between the interior of capsules 40 and the annular gap 28 around the core 24. And by virtue of the fact that all the main components, in particular the encapsulated hydrophone assemblies 30, the electronics modules 34, and their associated interconnections 36, are embedded in the solid core 24, they are well protected against the harsh environment in which the streamers are used and against contamination, eg by sea water, so that robustness and life of the streamers are much improved. Finally, the use of the buoyancy pills 38, 38a or 38b in the solid core 24 has the result that considerably less kerosene is required than in the typical streamer mentioned in the introduction.

Many modifications can be made to the described embodiments of the invention.

For example, if the formation of voids in the injected material of the core 24 can be minimised, the inlets 44, 50 to the capsules 40, and the drilling to provide communication between these inlets and the annular gap 28, can be eliminated. In this case, the capsules 40 are filled with kerosene or other suitable fluid, or a gel, and then seated, before being incorporated into the subassembly which forms the basis of the core 24. Or the injected plastics material can be replaced by a suitable gel.

In the embodiments of the invention described with reference to FIGS. 1 to 10, the Kevlar stress members 32 are circular in section and offset from the plane which contains the central axis of the streamer 10, a form of construction which tends to lead to a reduction in the overall diameter of the streamer 10. However, in an alternative form of construction, the Kevlar stress members 32 have an oval section, and are positioned symmetrically on each side of the central axis of the streamer 10 in a plane containing that axis. This alternative form of construction is used in the embodiments of FIGS. 11 to 14.

Figure 11:
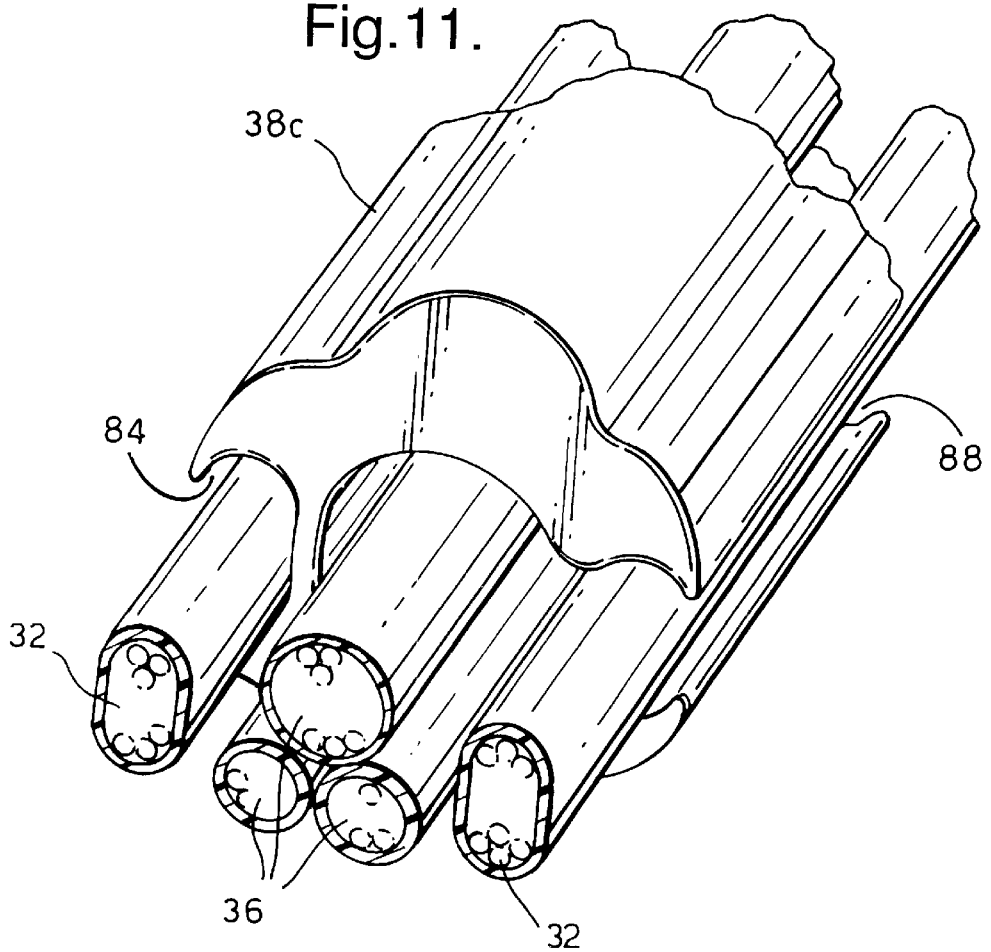
FIGS. 11 and 12 are enlarged perspective views of part of another embodiment of a seismic streamer in accordance with the present invention.
Figure 12:
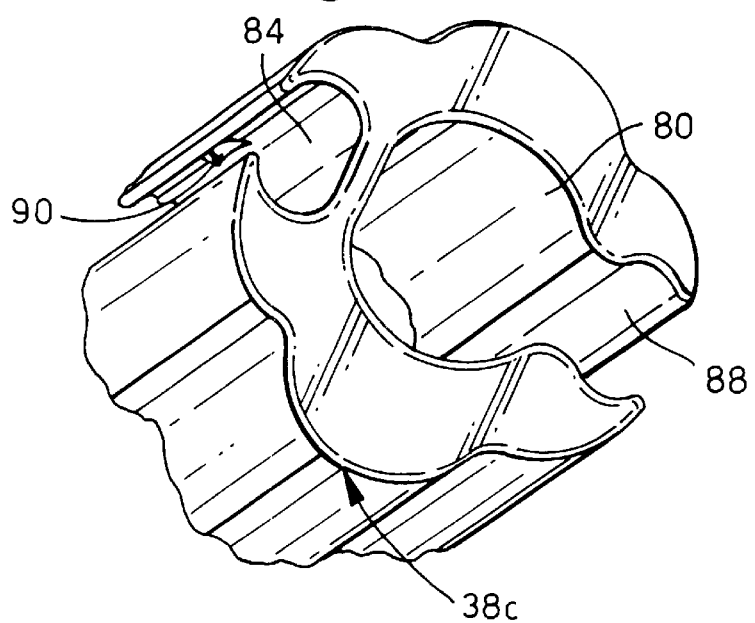

Thus in the embodiment of FIGS. 11 and 12, the buoyancy pills, only one of which is shown at 38c, are generally C-shaped in cross section, with an outwardly facing partly open channel 84 formed in the upright part of the C-shape for receiving one of the Kevlar stress members 32. The wire and optical bundles 36 are received in the hollow space 86 within the C-shape, while a second channel 88 is defined between the opposed extremities of the C-shape and receives the other Kevlar stress member 32. The material of buoyancy pill 38c is sufficiently resilient for the channels 84, 88 to be opened up to fit over the Kevlar stress members and the wire and optical fibre bundles 36, and then to partly close again to engage and grip those components. This engagement is enhanced for at least the channel 84 by including in it a small projection 90, which slightly "digs into" its Kevlar stress member 32 to inhibit movement of the buoyancy pill along the stress member.

Figure 13:
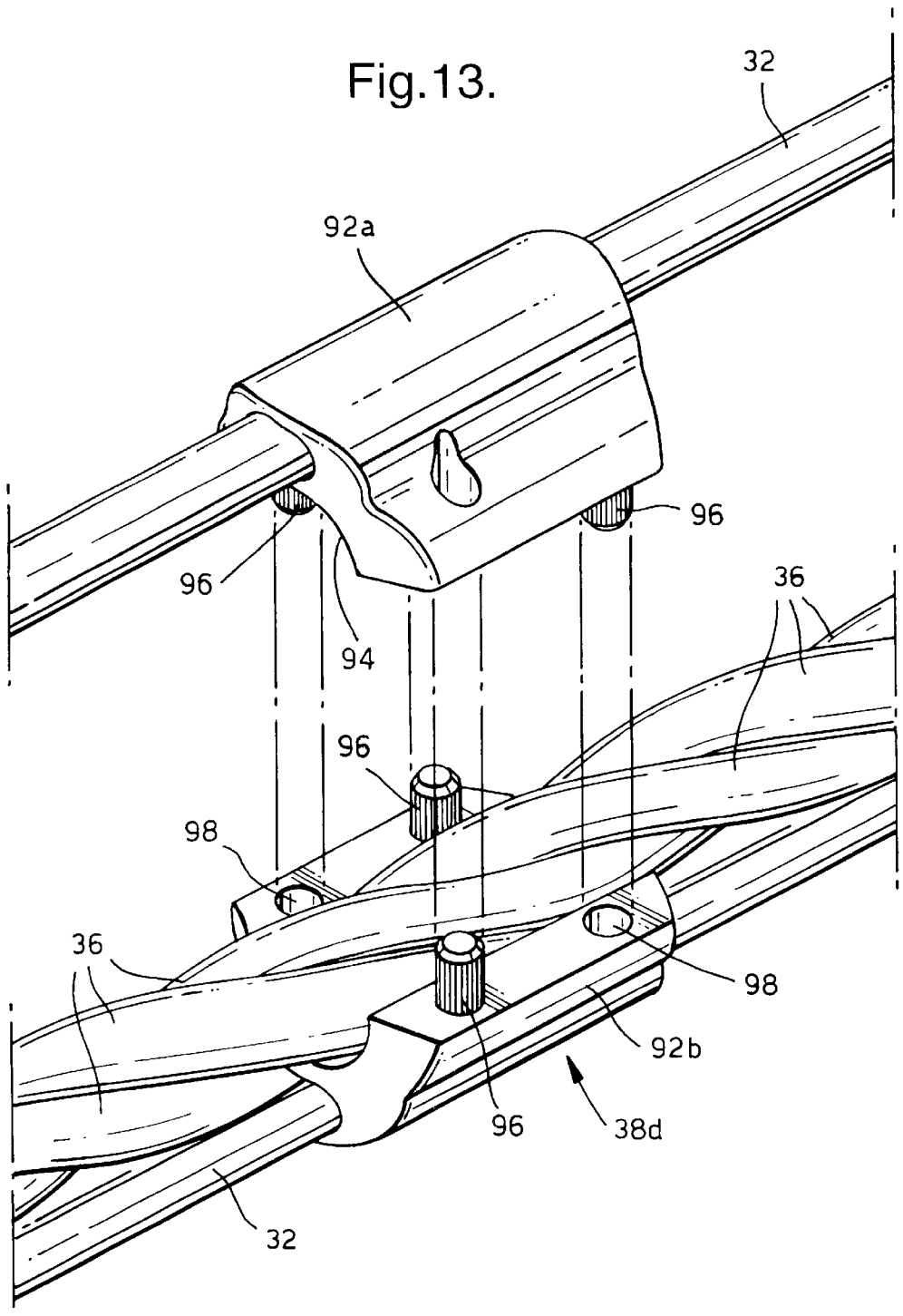
FIG. 13 is an exploded view of part of yet another embodiment of a seismic streamer in accordance with the present invention.

In the embodiment of FIG. 13, the buoyancy pills, only one of which is shown at 38d, are generally annular and made in two halves 92a and 92b which mate in a plane extending diametrically through them. Each half 92a, 92b has a channel 94 which receives a respective one of the Kevlar stress members 32, and is either threaded onto or moulded around its stress member 32 during manufacture. The two halves 92a, 92 fit tightly together around the wire and optical bundles 36, and are held together by the engagement of co-operating pins 96 and holes 98 provided on and in their mating surfaces. The pins 96 are serrated and very slightly larger than the holes 98, to ensure the tightness of the fit.

The wire and optical fibre bundles 36 are twisted together to provide a degree of strain or tension relief.

Figure 14:
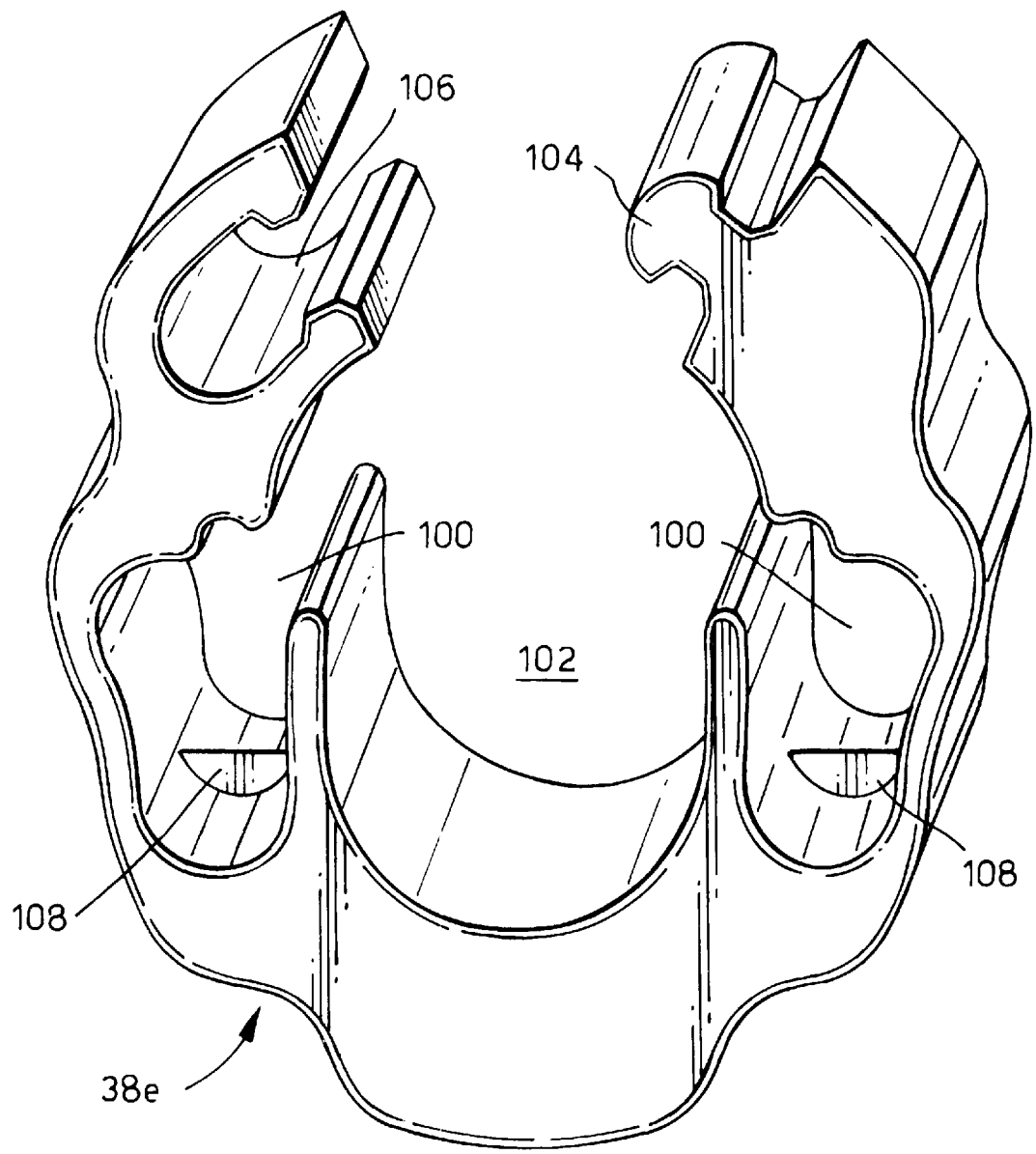
FIG. 14 is an enlarged perspective view of part of a still further embodiment of a seismic streamer in accordance with the present invention.

FIG. 14 shows, at 38e, yet another possible form of annular buoyancy pill, which resiliently hinges open along an axial split line to receive Kevlar stress members 32 and the wire and optical fibre bundles 36 in respective channels 100 (for the stress members 32) and 102 (for the wire and optical fibre bundles 36). The channels 100 and 102 in the buoyancy pill 38e are then closed around the Kevlar stress members 32 and the wire and optical fibre bundles 36 by closing the buoyancy pill along its split line, and the pill is held closed by the engagement of an axially extending peg and groove confirmation extending along the split line. Typically, the buoyancy pills 38e are moulded in a half open state, to reduce the amount of strain put on them during opening and closing.

The channels 100 contain respective small projections 104 analogous to and performing the same function as the projection 90 mentioned earlier in relation to the buoyancy pill 38c of FIGS. 11 and 12.

As an alternative to twisting together the wire and optical fibre bundles 36 to provide strain or tension relief, at least the wires can be passed around a spring loaded device which compresses against the action of its spring when tension is applied to the wires.

Yet another modification which can be made, particularly in connection with the embodiments of FIGS. 11 to 14, is to increase the number and/or buoyancy of the buoyancy pills 38 until the core 24 is approximately neutrally buoyant in water. In this case, the outer skin 26 and the kerosene-filled polyurethane foam enclosed by it can simply be omitted, and the core 24 can be used on its own as a solid streamer section.

Finally, at least in embodiments where gel is injected into the tube 39 during manufacture, it is even possible to dispense with the capsules 40 altogether, so that the hydrophones are simply supported in the gel.

What is claimed is:

1. A seismic streamer comprising an elongate substantially solid core, at least one longitudinally extending strength member and a plurality of hydrophones embedded in said core, a plastics outer skin surrounding said core and defining therearound an annular space, and plastics foam material adapted to be substantially saturated with liquid and substantially filling said annular space.

2. A streamer as claimed in claim 1, wherein said hydrophones are encapsulated in capsules having at least one opening communicating with said annular space.

3. A streamer as claimed in claim 2, wherein said core comprises a tube containing a plastics or gel filler material.

4. A streamer as claimed in claim 3, further comprising a plurality of foam buoyancy elements embedded in said filler material between said hydrophones.

5. A seismic streamer comprising an elongate plastics tube, at least one elongate strength member disposed within the tube and extending longitudinally thereof a plurality of buoyancy elements which engage the strength member at intervals therealong, and a plurality of hydrophones longitudinally spaced apart within the tube and disposed between the buoyancy elements, the tube containing a substantially solid plastics or gel filler material around the hydrophones and the buoyancy elements.

6. A streamer as claimed in claim 5, comprising two spaced apart substantially parallel strength members which are substantially symmetrically disposed, one on each side of the axis of the tube in a plane containing the axis of the tube.

7. A streamer as claimed in claim 6, wherein each buoyancy element has respective channels passing therethrough for receiving the strength members.

8. A streamer as claimed in claim 7, wherein at least one of the channels in each buoyancy element has a projecting portion which engages the strength member.

9. A streamer as claimed in claim 8, wherein the buoyancy elements are resilient and each channel therein has a longitudinally extending opening which can be opened to receive its strength member.

10. A streamer as claimed in claim 9, wherein the buoyancy elements are moulded onto the at least one stress member.

11. A streamer as claimed in claim 10, wherein said buoyancy elements are made from a skinned plastics foam material.

12. A streamer as claimed in claim 11, wherein said foam material is polypropylene foam.

13. A streamer as claimed in claim 12, further comprising a plurality of electronics modules each comprising electronic circuitry for processing the signals produced by a plurality of said hydrophones, said electronics modules being embedded in the filler material between the hydrophones.

14. A streamer as claimed in claim 13, wherein said electronic circuitry is disposed in a cylindrical metal container.

15. A streamer as claimed in claim 14, wherein said container is made of aluminium.

16. A streamer as claimed in claim 15, wherein said hydrophones are connected to said electronic modules by electrical conductors which are also embedded in the filler material.

17. A streamer as claimed in claim 16, further comprising additional electrical conductors for providing power to the electronics modules, and optical fibres, said additional conductors and optical fibres also being embedded in the filler material.

18. A streamer as claimed in claim 17 wherein each hydrophone is contained in a respective capsule.

19. A streamer as claimed in claim 18, wherein each capsule is substantially cylindrical, with its axis extending parallel to the longitudinal axis of the tube, and each hydrophone is also substantially cylindrical and supported substantially coaxially within its capsule by a plastics foam sleeve disposed between the hydrophone and the capsule.

20. A streamer as claimed in claim 19, wherein the outside surface of the capsule is provided with locating means to partially receive and locate with the or each strength member.

21. A streamer as claimed in claim 20, wherein each hydrophone comprises a hollow piezoelectric cylinder made from a ceramic material and having respective electrodes on its external and internal cylindrical surfaces.

22. A streamer as claimed in claim 21, wherein the or each strength member is made from high strength fibres such as Kevlar fibres.

23. A method of making a seismic streamer, the method comprising the steps of:

forming a subassembly comprising at least one elongate strength member having buoyancy elements secured thereto at intervals therealong and hydrophones disposed between some of the buoyancy elements drawing said subassembly through a plastic tube; and injecting plastics material or gel into said tube to substantially fill the rest of the interior of the tube.

24. A method claimed in claim 23, wherein the hydrophones are contained in capsules which are secured to the or each strength member.

25. A method as claimed in claim 24, wherein said forming step further includes securing a plurality of electronics modules in said subassembly between the hydrophones, and electrically connecting each of said electronics modules to a plurality of said hydrophones.

26. A method as claimed in claim 25, wherein the electronics modules are secured in said subassembly by glue.

27. A method as claimed in claim 26, wherein said forming step further includes securing at least one optical fibre and at least one power line in said subassembly.

28. A method as claimed in claim 27, wherein said optical fibre and said power line are secured in said subassembly by glue.

29. A method as claimed in claim 28, wherein the plastics material or gel is injected into the plastic tube via one or both of its ends and/or via a plurality of orifices provided along its length.

30. A method as claimed in claim 29, wherein said plastic tube is maintained at an elevated temperature during the injecting step.

31. A method as claimed in claim 30, wherein said plastic tube is maintained at an elevated temperature by surrounding it with a jacket through which fluid at an elevated temperature is circulated.

32. A method as claimed in claim 31, wherein said plastic tube is provided with longitudinally extending ribs along its internal surface.

33. A method as claimed in claim 32, further comprising fitting a plurality of annular members made of plastics foam material around the outside of the plastic tube, and drawing an outer skin over the annular members and the tube.

34. A method of making a marine seismic streamer comprising an elongate substantially solid core, and at least one longitudinally extending strength member and a plurality of hydrophones embedded in said core, the method comprising the steps of:

forming a subassembly comprising said at least one strength member having said hydrophones secured thereto at intervals therealong;

drawing said subassembly through a plastics tube; and injecting plastics material or gel into said tube to substantially fill the rest of the interior of the tube.

* * * * *